United States Patent [19]

Fisher

[11] 4,123,662

[45] Oct. 31, 1978

[54] SHIELD BAG

[75] Inventor: John M. Fisher, Cuyahoga Falls, Ohio

[73] Assignee: The B.F. Goodrich Company, Akron, Ohio

[21] Appl. No.: 775,076

[22] Filed: Mar. 7, 1977

[51] Int. Cl.² .................................................. G21C 11/00
[52] U.S. Cl. .................................... 250/518; 250/507; 176/87
[58] Field of Search .......................... 176/37, 38, 87; 250/507, 508, 518, 519, 506

[56] References Cited

U.S. PATENT DOCUMENTS

| | | | |
|---|---|---|---|
| 3,142,649 | 7/1964 | Blanco et al. | 250/518 X |
| 3,288,998 | 11/1966 | Press, Jr. | 250/518 X |
| 3,536,920 | 10/1970 | Sedlak et al. | 250/519 |
| 3,818,234 | 6/1974 | Atkins et al. | 250/518 X |
| 3,884,839 | 5/1975 | Bon et al. | 250/518 X |
| 3,891,845 | 6/1975 | English | 250/508 X |
| 3,942,023 | 3/1976 | Flaugnatti | 250/519 X |
| 3,963,936 | 6/1976 | Lowe | 176/87 X |
| 3,984,282 | 10/1976 | Kleimola | 176/37 X |
| 4,036,700 | 7/1977 | Dorner et al. | 176/38 X |

FOREIGN PATENT DOCUMENTS 2,461,243  6/1976  Fed. Rep. of Germany .......... 250/519

Primary Examiner—Peter A. Nelson
Attorney, Agent, or Firm—Harry F. Pepper, Jr.

[57] ABSTRACT

A flexible, fabric reinforced, elastomeric bag is used to contain water for neutron shielding in nuclear reactor installations. The lower surface of the bag is provided with a series of anchoring strips to secure the bags in various installation locations where shielding is desirable. The anchoring strips are adapted to be peeled from the lower surface of the bag and to sever or slit the bag wall to quickly release the water contained in the bag, thereby preventing the bag from acting as a missile due to forces applied to the bag in the event of an explosion or accidental pipe break from beneath the bag.

6 Claims, 5 Drawing Figures

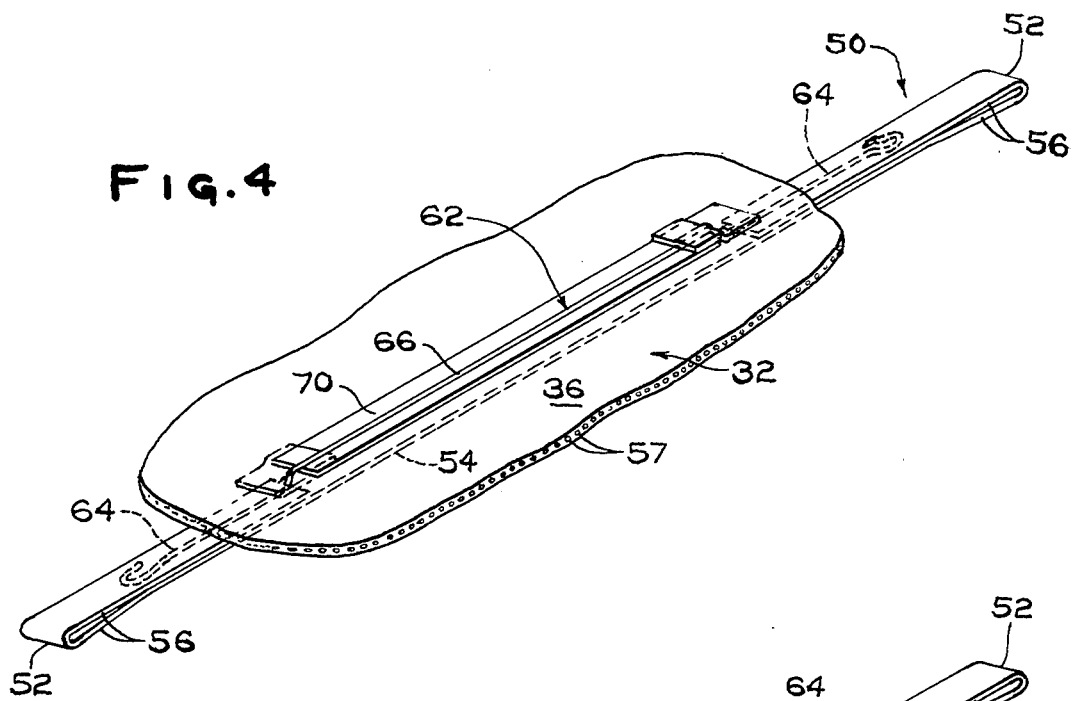
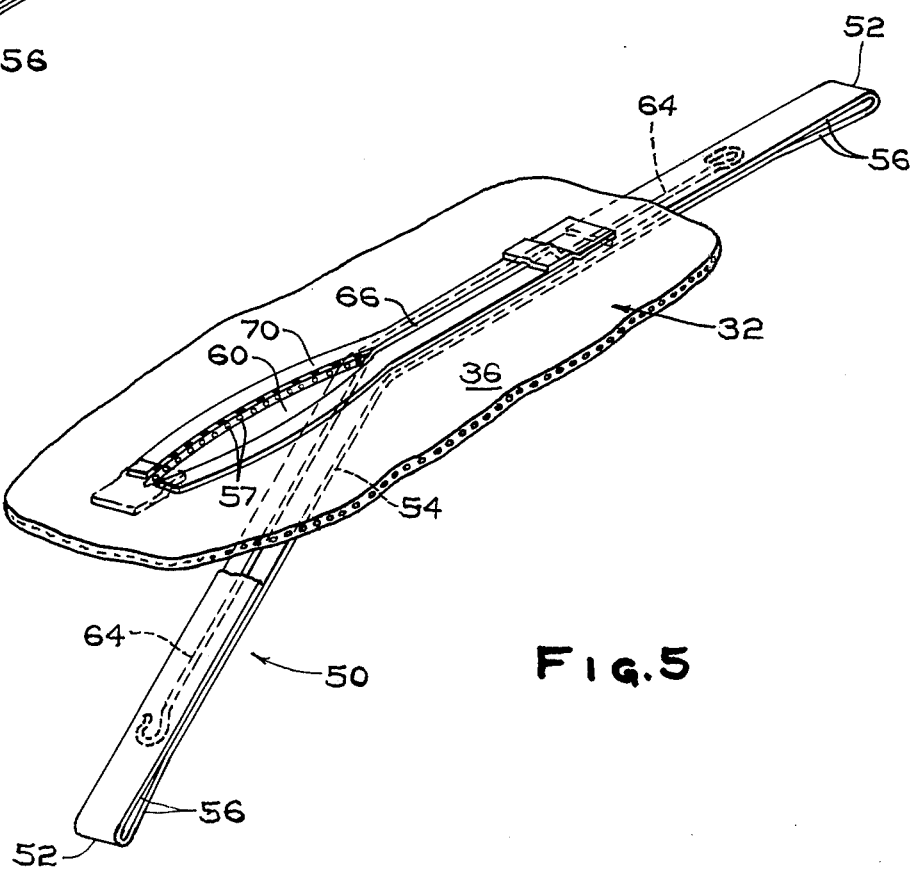

4,123,662

SHIELD BAG

BACKGROUND

The invention relates to flexible bag containers and more particularly to such flexible bag containers adapted for use as nuclear shielding in reactor installations.

The use of liquid filled compartments or chambers in nuclear installations for neutron shielding is well known. Commonly, these compartments are designed into various portions of the installation structure such as a pressure vessel which encases the reactor core and the housing surrounding the pressure vessel. Also, it is typical in certain nuclear installations to provide working areas or platforms inside the installation outer housing in the area or cavity adjacent the outer surface of the pressure vessel.

In such typical installations, high pressure fluid flows into and out of the pressure vessel through piping leading to and from the pressure vessel. In designing structure, such as work platforms, to be located within the cavity and adjacent the pressure vessel, it is desirable that the design of the structure takes into account the possibility of an accidental pipe break or leak. An accidental release of these high pressure fluids would be of such intensity as to cause structural elements within the installation to respond as high velocity missiles which could cause severe and sometimes irreparable damage.

In accordance with the foregoing, work platforms, which are often located immediately above the aforementioned high pressure pipe lines, are of open grid-like construction which, in the event of accidental high pressure release or explosion, will not react as a destructive missile. It is, however, further desirable that these platforms be provided with neutron shielding, which shielding must also be designed as nonmissile-like.

SUMMARY

The invention provides a neutron shielding device for a nuclear reactor installation designed to prevent its being propelled in destructive missile-like fashion in the event of an accidental high pressure release within the installation. The device is particularly useful for shielding open grid-like work platforms and comprises a flexible, fabric reinforced, elastomeric bag having a plurality of walls defining a closed, sealed chamber for neutron shielding fluid such as water. An anchoring means is provided for the bag, which is attached to at least one of the bag walls and extends therefrom in order to secure the bag to structure, such as the open grid work of a work platform. In the event of a high pressure release or explosion, forces tending to propel the secured bag from the platform cause the bag to detach from the anchoring means which peels from the wall or walls of the bag and simultaneously severs or splits the bag to release the contents of the bag. The emptied bag will not react as a missile due to high pressure forces resulting from an accident.

In a preferred form, the aforementioned anchoring means is an elongated strip having a wall severing portion adhered to a portion of one of the bag walls and a bag securing portion free of such wall. The severing portion of the strip includes a cutting thread having a length thereof disposed within the bag chamber and extending along the inner surface of the bag wall.

THE DRAWINGS

In the drawings:

FIG. 4 is an enlarged view of a portion of the underside of the bag depicted in FIGS. 2 and 3.

FIG. 5 is another enlarged view of a portion of the underside of the bag depicted in FIGS. 2 and 3.

DESCRIPTION OF A PRESENTLY PREFERRED EMBODIMENT

Figure 1:
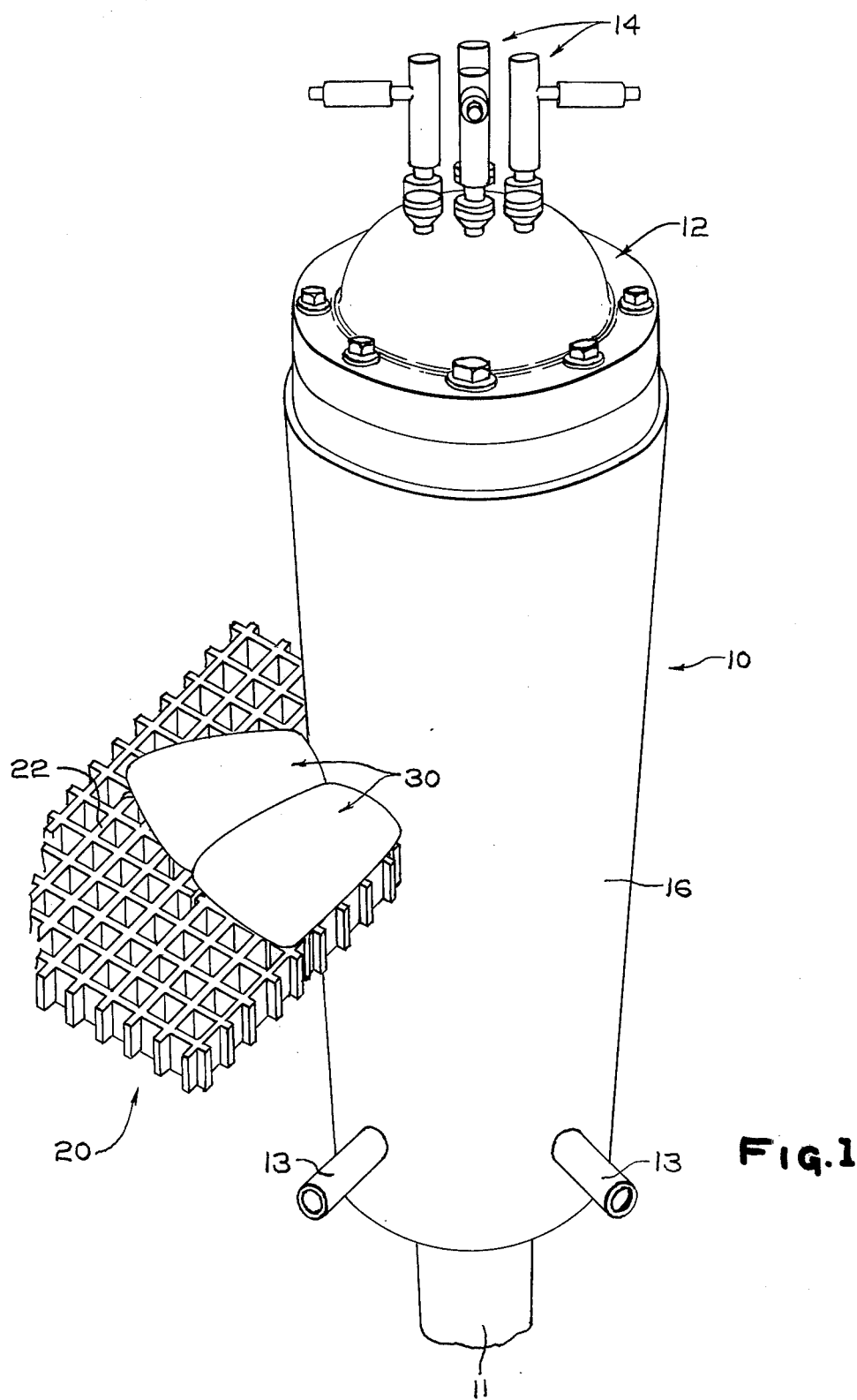
FIG. 1 is a perspective view of a typical nuclear reactor pressure vessel having a working platform adjacent thereto where shielding devices according to the present invention find utility.

In FIG. 1, a typical pressure vessel 10 for a nuclear reactor installation, includes a top head 12, through which a series of control rod drives 14 extend for manipulation of control rods (not shown) within the pressure vessel wherein there is contained a reactor core (also not shown). A portion of a rigid grid-like work platform 20 is shown adjacent the pressure vessel 10, which usually is made to surround or encircle the outer surface 16 of the pressure vessel outer wall. Also, typically an inlet pipe such as 11 and one or more outlet pipes such as 13 are provided in the lower portion of pressure vessel 10 to carry high pressure fluid to and from the vessel.

Neutron shielding for the working platform 20 is provided by a plurality of water filled flexible bags 30 secured to the platform 20 along its upper surface 22. It is understood that although only two such bags 30 are shown in FIG. 1, it is contemplated that the entire top surface 22 of the entire work platform 20 is covered with suitably arranged plurality of bags such as 30. Workmen standing or walking on the platform 20 may do so directly upon the bags 30 or may utilize an auxiliary platform, such as a wooden slab, lying upon bags 30, which auxiliary platform would be removed upon departure from the area by the workmen.

Figure 2:
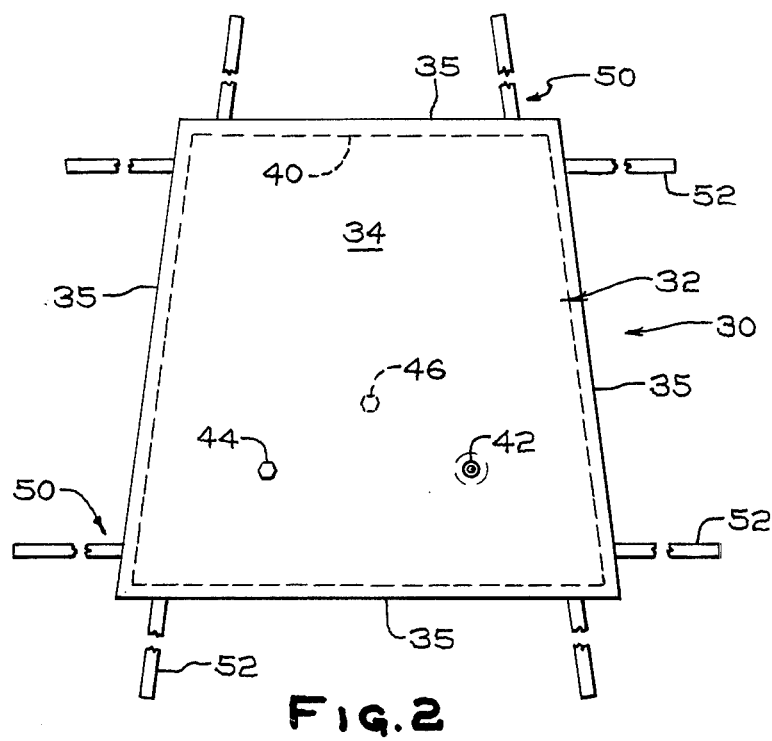
FIG. 2 is a top view of a neutron shield bag according to a presently preferred form of the invention.
Figure 3:
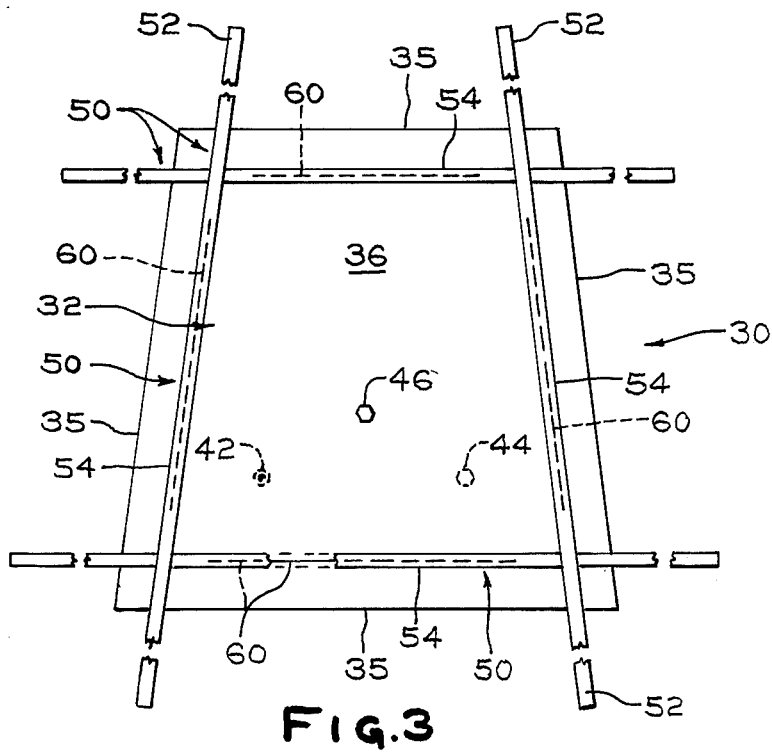
FIG. 3 is a bottom view of the bag shown in FIG. 2.

As seen in FIGS. 2 and 3, a shield bag 30 in a preferred form comprises a bag body member 32 composed of a substantially planar upper wall 34 joined to a substantially planar lower wall 36 through sidewall portions 35 to enclose a sealed fluid chamber 40.

An inlet port 42 is disposed in upper wall 34 for filling chamber 40 with neutron shielding fluid, such as water. A vent port 44 is also provided in upper wall 34 to vent entrapped air while bag body 32 is being filled through an inlet port 42. A fluid discharge port 46 is provided in lower wall 36 for emptying bag body 32 when desired. Each port 42, 44, 46 is provided with a suitable closure such as a cap, valve, etc., in accordance with the function of the particular port.

The body 32 of bag 30 is preferably constructed of fabric reinforced, vulcanized, elastomeric material. A typical construction found presently suitable is neoprene reinforced by square-woven nylon fabric. The body 32 of bag 30 can be readily assembled by joining two panels of neoprene impregnated square woven nylon, shaped generally in the form of upper and lower walls 34 and 36, along their margins by small strips or tapes (not shown) of neoprene impregnated nylon to form sidewall juncture portions 35. Although the bag body 32 shown is generally of trapezoidal configuration, any other configuration found suitable or desired can be used.

The bag 30 is adapted for securement to a structure by means of a series of anchoring strips 50. Four of such strips 50 are shown in FIGS. 2 and 3 disposed along bottom wall 34 of bag body member 32. Each strip is disposed so that a portion 52 at each end extends from the bag body 32 a sufficient distance to permit tying or otherwise securing the bag thereby to a structure such as a gridlike work platform. Between each end portion 52 of each strip is a bag severing portion 54 adhered to the lower wall 36. Each adhered portion 54 of each strip 50 coextends with and covers a pre-slit portion 60 in lower wall 36 adjacent each sidewall 35 of bag body member 32.

Further details of the bag body-anchoring strip connection details are shown in FIGS. 4 and 5 where a portion of lower wall 36 of bag body 32 is shown viewed from inside the bag body.

In FIGS. 4 and 5, a strip 50 with ends 52 and severing portion 54 is shown carrying a cutting thread 62. The ends 64 of thread 60 are held within the two layer folds 56 of each end 52 of anchor strip 50. The intermediate portion 66 of thread 62 is positioned away from anchor strip 50 to extend along a portion of the inner surface of wall 36 adjacent the pre-slit portion 60 thereof. A strip of rubber 70 severable by the thread 62 is positioned between the intermediate portion 66 of thread 62 and the pre-slit portion 60 of bottom wall 36. This is to seal the bag body from leakage of shielding fluid through the pre-slit portion 60 and also to prevent any possible degradation by absorption of liquid of the bag body member reinforcing cords 57 which have ends exposed along each pre-slit portion 60.

As illustrated in FIG. 5 when end portion 52 of strip 50 is pulled away from lower wall 36 as would occur in the event of an explosive force acting upon an anchored bag 30 from below the thread 62 cuts through the rubber strip 70 and neutron shielding liquid such as water will be quickly released from the bag body through each open slit 60 in lower wall 36.

It is evident that several variations from or modifications to the particular embodiment shown are possible without such variations or modifications being outside the scope of the present invention to be measured by the attached claims.

I claim:

1. A neutron shield bag having a plurality of flexible walls enclosing a sealed chamber, port means in said bag for filling said chamber with neutron shielding fluid, and bag anchoring means attached to and extending from at least one of said walls to secure said bag in shielding position, said anchoring means being adapted to detach from a portion of said wall and sever said wall along such portion.

2. The neutron shield bag defined in claim 1 wherein said anchoring means comprises at least one elongated strip having
    (A) a severing portion adhered to the outer surface of said at least one wall and
    (B) a bag securing portion free of said wall.

3. The neutron shield bag defined in claim 2 wherein said severing portion includes a cutting thread having a length thereof disposed within said chamber and extending along the inner surface of said at least one wall.

4. The neutron shield bag defined in claim 1 wherein said flexible walls include a top and bottom wall which are substantially mutually parallel when said chamber is filled with fluid and wherein said anchoring means is attached to and extends from said bottom wall.

5. The neutron shield bag defined in claim 4 wherein said anchoring means comprises at least one elongated strip having
    (A) a severing portion adhered to the outer surface of said at least one wall and
    (B) a bag securing portion free of said wall.

6. The neutron shield bag defined in claim 5 wherein said severing portion includes a cutting thread having a length thereof disposed within said chamber and extending along the inner surface of said at least one wall.

* * * * *